(12) United States Patent
Hokenek

(10) Patent No.: US 12,360,022 B2
(45) Date of Patent: Jul. 15, 2025

(54) TISSUE DISAGGREGATION, HOMOGENIZATION, PHOTOACTIVATION DEVICE

(71) Applicant: GLOBAL BIYOMEDIKAL SAGLIK HIZMETLERI SANAYI VE TICARET LIMITED SIRKETI, Istanbul (TR)

(72) Inventor: Seyithan Hokenek, Istanbul (TR)

(73) Assignee: GLOBAL BIYOMEDIKAL SAGLIK HIZMETLERI SANAYI VE TICARET LIMITED SIRKETI, Istanbul (TR)

( * ) Notice: Subject to any disclaimer, the term of this patent is extended or adjusted under 35 U.S.C. 154(b) by 797 days.

(21) Appl. No.: 17/642,616

(22) PCT Filed: Sep. 11, 2019

(86) PCT No.: PCT/TR2019/050745
§ 371 (c)(1),
(2) Date: Apr. 29, 2022

(87) PCT Pub. No.: WO2021/050013
PCT Pub. Date: Mar. 18, 2021

(65) Prior Publication Data
US 2022/0341824 A1    Oct. 27, 2022

(51) Int. Cl.
*G01N 1/00*    (2006.01)
*G01N 1/28*    (2006.01)

(52) U.S. Cl.
CPC ..... *G01N 1/286* (2013.01); *G01N 2001/2866* (2013.01)

(58) Field of Classification Search
None
See application file for complete search history.

(56) References Cited

U.S. PATENT DOCUMENTS

| 9,962,717 | B1 | 5/2018 | Micic |
| 11,162,936 | B2 * | 11/2021 | Holmes ............ G01N 21/07 |
| 2019/0079063 | A1 | 3/2019 | Gilboa-Geffen et al. |

FOREIGN PATENT DOCUMENTS

CN    110174369 A    8/2019

OTHER PUBLICATIONS

Brian C. Wilson: "Photodynamic Therapy/Diagnostics: Principles, Practice, and Advances" dated May 18, 2010, pp 649-686, vol. 20102371, in: "Handbook of Photonics for Biomedical Science," CRC Press, XP055707033.

(Continued)

*Primary Examiner* — Jyoti Nagpaul
(74) *Attorney, Agent, or Firm* — Crowell & Moring LLP

(57) ABSTRACT

A disaggregation and homogenization device may be capable of photoactivation to improve heat resilience, photoactivation efficiency and simultaneous processing. Processes of disaggregation and homogenization may be handled in a simultaneous manner at will. A photoactivation means is also present such that rendering simultaneous utility of photoactivation and homogenization may be possible, and elimination of extra steps for preparation may be implemented. Protocols of the processes are registerable and adjustable in parameters i.e. rate of revolution and duration of process overall; and may be executed through an electronic control unit capable of storing and executing said protocols.

9 Claims, 3 Drawing Sheets

(56) References Cited

OTHER PUBLICATIONS

Tiina I. Karu: "Chromophores (Photoacceptors) for Low-Level Laser Therapy" dated Oct. 22, 2013, pp. 521-534, in: "Chromophores (Photoacceptors) for Low-Level Laser Theragx"in "Handbook of Photomedicine," XP055707036

Seta BioMedicals: "SETA BioMedicals SETA BioMedicals Fluorescent Tools for BioMedical Applications Product number: K10-7801 Product name: Seta-APC-780 General Data" dated Nov. 16, 2014, pp. 1, XP055707118, URL: https://www.setabiomedicals.com/files/Pdf/K10-7801.pdf (retrieved on Jun. 19, 2020).

International Search Report and Written Opinion of the International Searching Authority dated Oct. 7, 2020, pp 1-13, issued in International Patent Application PCT/TR2019/050745, European Patent Office, Rijswijk, the Netherlands.

* cited by examiner

TISSUE DISAGGREGATION, HOMOGENIZATION, PHOTOACTIVATION DEVICE

CROSS-REFERENCE TO RELATED APPLICATIONS

This application is continuation of PCT/TR2019/050745 filed Sep. 11, 2019, which is herein incorporated by reference in its entirety.

TECHNICAL FIELD

The invention presented hereby generally concerns systems, methods and devices for analysis of biological material such as samples from a living organism on the cellular level, called cytometry. The disclosed invention more specifically falls within the technical areas of cytometry for purposes of diagnosis and treatment such as blood tests, blood counts, research and medical diagnostics.

BACKGROUND

Cytometry refers to methods for measurement of certain properties and characteristics of cells such as cell size, cell count, morphology and genetic content. A common usage is found in medical industry, particularly in hematology where size and quantity of particles and cells make up the blood are determined for various purposes including diagnostic and treatment-oriented ones. For different applications, homogenization attempts to bring a sample to a state where all fractions of the sample have equal composition. Homogenization is an important step in analytical testing because through removing sample matrices, the shielded analytes are made accessible to the probes and/or instruments that are employed in their detection. Additionally, by spreading the analytes uniformly throughout the sample, homogenization aids in the efficient extraction of analytes in analytical procedures that involve analyte extraction prior to detection.

SUMMARY

Most methods and devices employing said methods still have technical shortcomings and problems yet to be addressed in full. For instance, a device in the art, albeit capable of disaggregation and separation, does not possess timing or revolution adjustment options. In addition, said device is also incapable of delivering processes of homogenization which require different revolution characteristics. The device also, as it comprises kits that contain the separation material as a component, allows only for atmospheric disaggregation i.e. that takes place in contact with air; which may cause contamination. Also lacking are a software support, registerable protocols or photoactivation capabilities.

Another device documented in the art addresses these problems in part with regards to timing and protocol registering; however still fails to offer a means for adjusting revolution characteristics. Said device is centered around homogenization systems that revolve at a steady, unalterable rate i.e. 4000 rpm which causes overheating in components of homogenization kits which contain material to be homogenized, causing them to degrade. Said device, like the one before, is also not capable of photoactivation.

U.S. Pat. No. 9,962,717 B1 discloses a multiplicity of instruments and methods for performing both sample homogenization and sample clarification by centrifugation with a single instrument without transferring the sample to a new sample container and without removing or repositioning the sample container within the instrument. Some embodiments of the instrument may automatically perform centrifugation after homogenization. In other embodiments, the instrument may perform both homogenization and centrifugation in a simultaneous manner.

The considerations regarding technologies of disaggregation/separation, homogenization and photoactivation include rate of revolution for effectuating separation and homogenization processes; heat exchange properties to bypass overheating due to high rpm; integrity of material and kits holding thereof, all of which are required to be addressed for improvement. It is important to point out that overheating persist especially in homogenization processes, where regularly utilized plastic parts perform poorly. Moving parts, as well as other non-moving parts that make up the devices are prone to wear and damage over time.

A feature of the disclosed invention is to present a device for tissue disaggregation and separation.

Another feature of the disclosed invention is to present a device for homogenization.

Another feature of the disclosed invention is to present a device for photoactivation.

Another feature of the disclosed invention is to present a device obviating the need for fan driven cooling after processes of disaggregation, separation and homogenization.

Yet another feature of the disclosed invention is to present a device comprising a strong, metal body.

Yet another feature of the disclosed invention is to present a device capable of simultaneously delivering disaggregation, separation and homogenization on demand.

Yet another feature of the disclosed invention is to present a device capable of providing timewise and ratewise adjustable processes of disaggregation and separation.

In the proposed invention, compact and efficient systems/devices with features contributing to simultaneous occurrence of both tissue disaggregation and homonegization processes are disclosed. In the disclosed invention, said processes of disaggregation/separation and homogenization further merge with the ability to induce photoactivation via a set of different options among which light-emitting diode (LED) usage occurs.

To offer an instrumental setting solid and durable against the wear and tear regularly occurring during said processes, the proposed invention comprises an aluminium body with innate heat sink properties against deformation and overheating as a design feature; enabling a stable setting for very high rates of revolutions-per-minute which may well exceed a rate of four thousand revolutions-per-minute, producing excess heat. Said property also alleviates the need for active cooling via fans.

In different embodiments of the disclosed invention, processes of disaggregation and homogenization may be handled in a simultaneous manner at will. Moreover, in various embodiments of the disclosed invention, a photoactivation means is present, rendering simultaneous utility of photoactivation and homogenization possible, eliminating extra steps for preparation. Protocols of both processes are registerable and adjustable in parameters i.e. rate of revolution and duration of process overall; executed through a electronic control unit capable of storing and overseeing said protocols.

BRIEF DESCRIPTION OF THE FIGURES

Accompanying figures are given solely for the purpose of exemplifying an rpm-adjustable disaggregation and homogenization device also capable of photoactivation, whose advantages over prior art were outlined above and will be explained in brief hereinafter.

The figures are not meant to delimit the scope of protection as identified in the claims nor should they be referred to alone in an effort to interpret the scope identified in said claims without recourse to the technical disclosure in the description.

DETAILED DESCRIPTION

Figure 1:
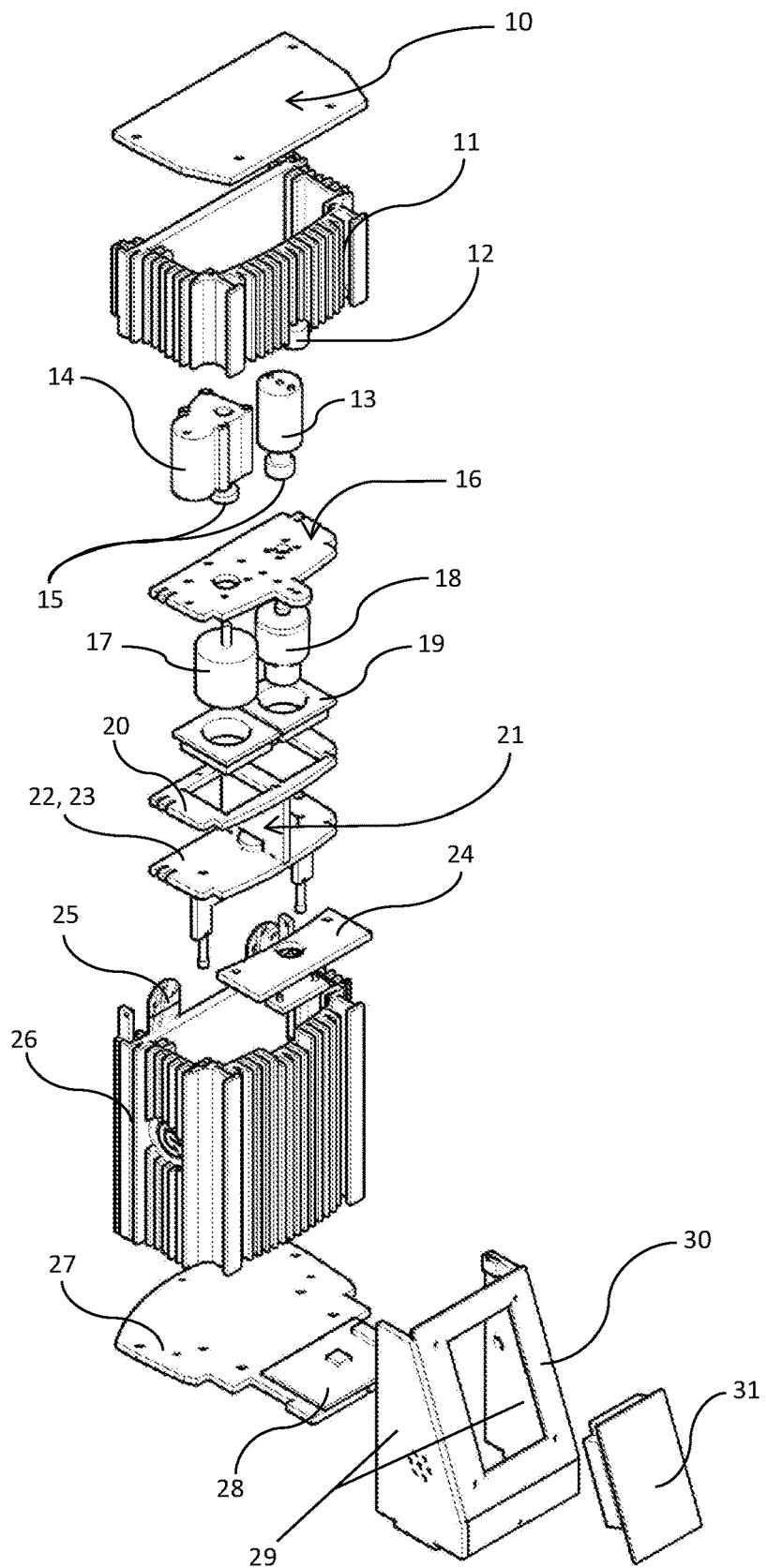
FIG. 1 demonstrates the exploded top perspective view of the device according to the disclosed invention.
Figure 2:
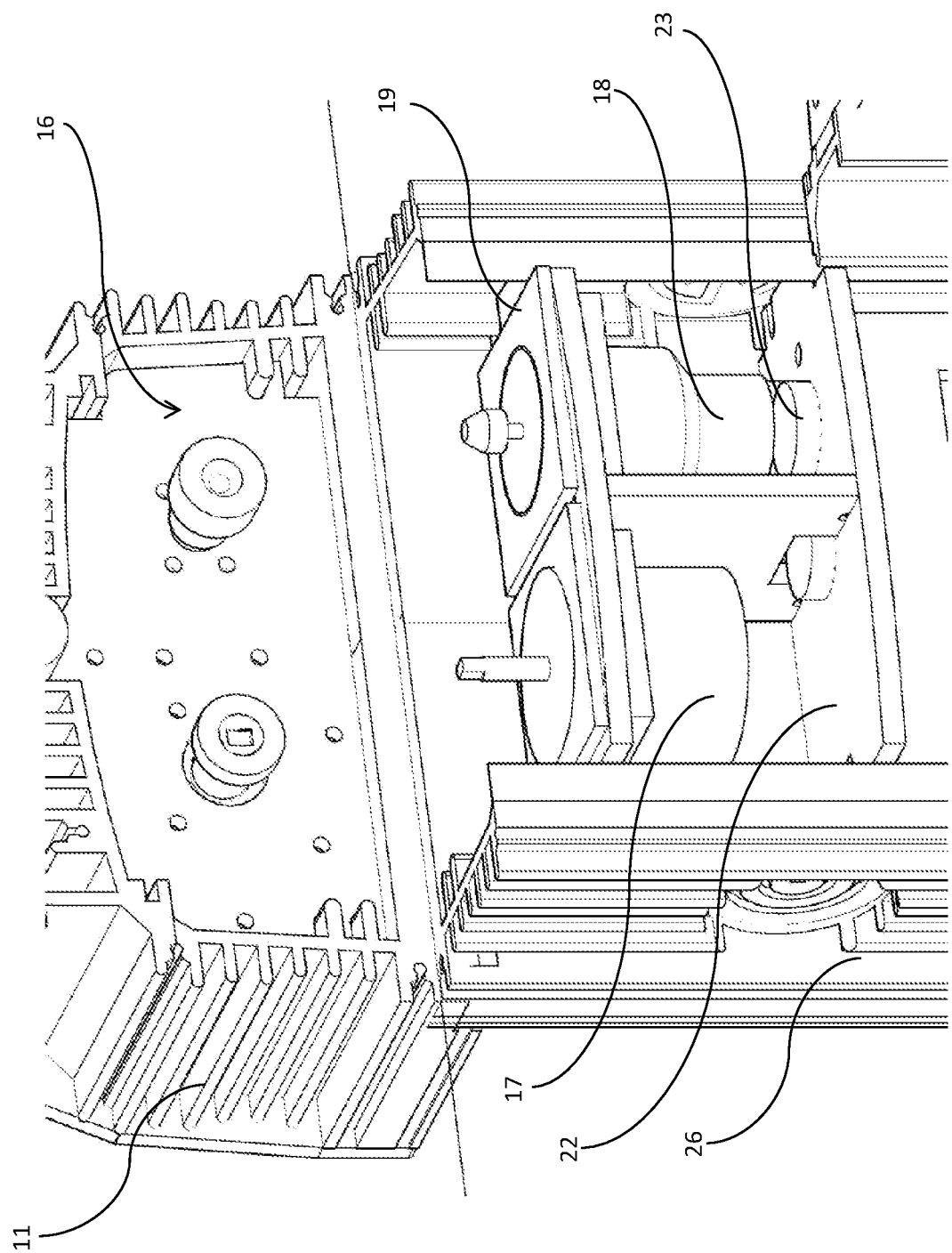
FIG. 2 demonstrates the calibration/cooling mount chamber comprising kits and the photoactivation means according to the disclosed invention.
Figure 3:
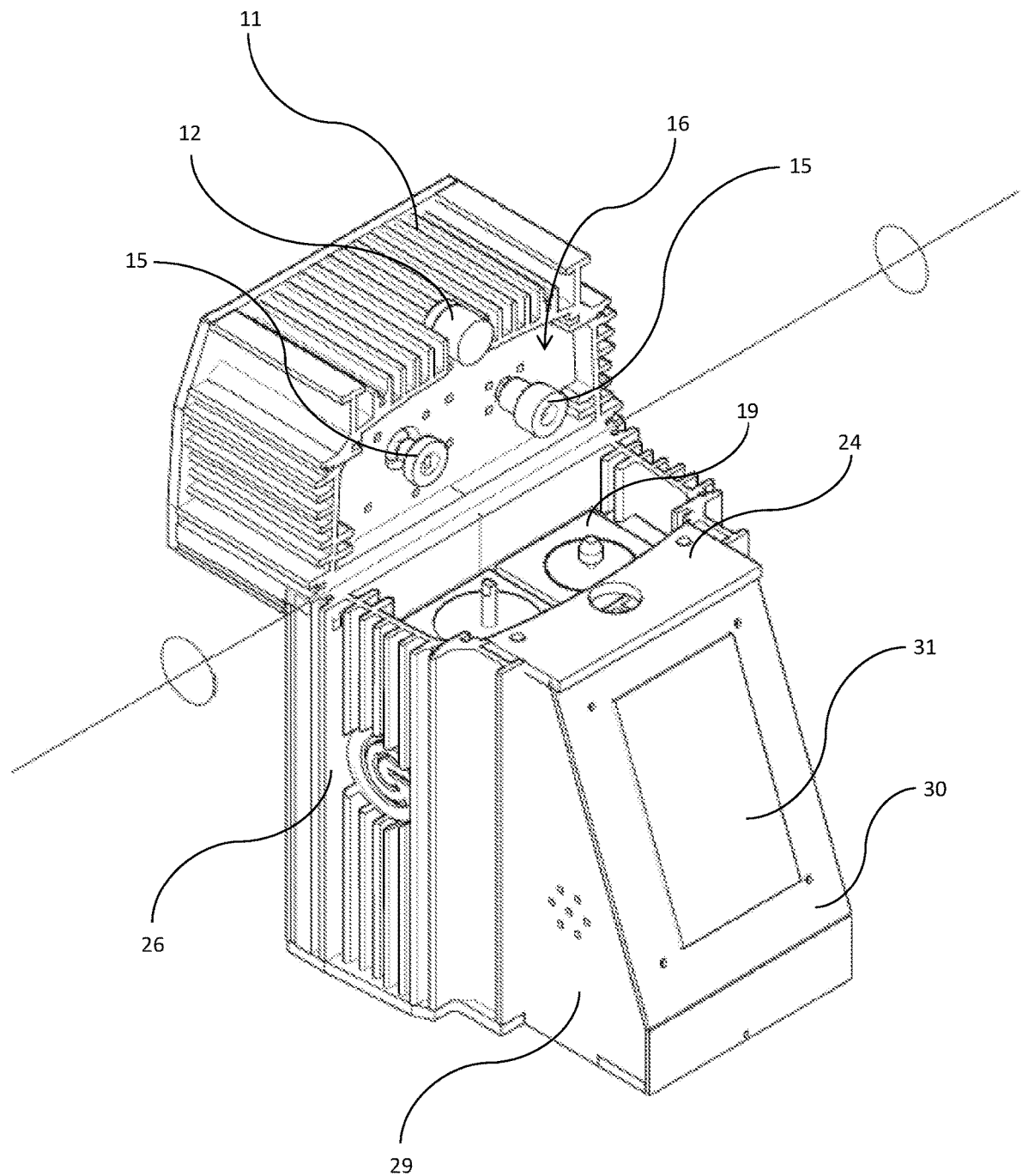
FIG. 3 demonstrates the top perspective view of the chamber formed by the bottom mount and the kit adapter in the open position of the device according to the disclosed invention.

10) Top lid
11) Top mount
12) Magnet
13) High RPM motor
14) Low RPM motor
15) Drive coupling
16) Motor mount
17) Low RPM kit
18) High RPM kit
19) Kit adapter
20) Kit mount
21) Kit mount support
22) Calibration and cooling mount
23) Photoactivation means
24) Magnet holding means
25) Hinge
26) Bottom mount
27) Bottom lid
28) Power supply
29) Frontal cover
30) Side cover
31) Electronic Control Unit (ECU)

In proposed invention, compact and efficient systems/devices with features contributing to simultaneous occurrence of both tissue disaggregation and homonegization processes are disclosed. In the disclosed invention, said processes of disaggregation/separation and homogenization further merge with the ability to induce photoactivation via a set of different oprions among which light-emitting diode (LED) usage occurs.

To offer an instrumental setting solid and durable against the wear and tear regularly occurring during said processes, the proposed invention comprises an aluminium body with innate heat sink properties against deformation and overheating as a design feature; enabling a stable setting for very high rates of revolutions-per-minute which may well exceed a rate of four thousand revolutions-per-minute, producing excess heat. Said property also alleviates the need for active cooling via fans.

In different embodiments of the disclosed invention, processes of disaggregation and homogenization may be handled in a simultaneous manner at will. Moreover, in various embodiments of the disclosed invention, a photoactivation means is present, rendering simultaneous utility of photoactivation and homogenization possible, eliminating extra steps for preparation. Protocols of both processes are registerable and adjustable in parameters i.e. rate of revolution and duration of process overall; executed through a electronic control unit (ECU) (31) capable of storing and overseeing said protocols.

According to at least one embodiment of the proposed invention, top mount (11) and bottom mount (26) are brought together with at least one, preferably two hinges (25) at corresponding sides thereof, whereas the opposite sides ensure tight closure with a magnet (12) at partial protrusion from said top mount (11) and a magnet holder (24) with structural relationship with said bottom mount (26) in a closed position.

According to at least one embodiment of the proposed invention, said top mount (11) houses two motors, namely a high RPM motor (13) and a low RPM motor (14) both of which are fixed into position with a motor mount (16) letting drive couplings (15) of said motors (13, 14) retain full rotatability. Said low and high RPM motors (13, 14) are controllable in speed, i.e. rate of revolution, determination of which in turn enables different types of tissue samples comprising different cells of various characteristics, such as different histoid and cellular characteristics, to be subjected to disaggregation.

According to at least one embodiment of the proposed invention, different disaggregation/separation methods may be employed due to the adjustable RPM feature, such as fatty tissue, hair follicles, connective tissue including but not limited to cartilage, skin etc. However, it is to be noted that at any rate, which is also characteristic considering their different purposes.

According to at least one embodiment of the proposed invention, said bottom mount (26) comprises a calibration and cooling mount (22) as a space confined within inner walls of said bottom mount (26) and above which a kit mount (22) that hosts one low RPM kit (17) and one high RPM kit (18). Said calibration and cooling mount (22) comprises, according to at least one embodiment, a photoactivation means (23). Said photoactivation means (23) further comprises a vertical and upwards light emission setting, which is in one particular embodiment a light-emitting diode (LED). Said photoactivation means (23) as an upwards positioned light emission setting enables, contrary to different photoactivation methods and devices in the art, ensures that light emitted by said means covers a wider effective range for reaching cells further away from a given light source, in turn increasing photoactivation efficiency greatly.

Embodiments of the invention comprise an electronic control unit (31) configured to execute tasks of homogenization, separation and photoactivation via commanding high RPM motor (13) and low RPM motor (14). Said ECU (31) may control said high and low RPM motors (13, 14) in aspects of duration and revolutions-per-minute and thus effectuate different regimes of operation. Homogenization and homogenization merged with photoactivation are distinct, different operation regimes, i.e. protocols. According to one embodiment, a homogenization process may last thirty seconds with a high rate of revolution. According to one embodiment, joint homogenization-photoactivation process may last twenty to thirty minutes with a low rate of revolution. The purpose for this is to retain material homogeneity within the timeframe required for photoactivation to be effectuated.

According to at least one embodiment of the proposed invention, the homogenization process is executed so that the kit and the material are not spoiled, enabled by the aforementioned adjustability feature of both the high RPM motor (13) and the low RPM motor (14). In an embodiment, a rate of revolution approximately between 1500-3000 RPM is deemed appropriate. In a particular embodiment, the rate of revolution for the high RPM motor (13) is set to be 2000 RPM.

According to at least one embodiment of the disclosed invention, a protocol for homogenization process is employed such that it runs for thirty seconds (30 s) at 2000 RPM.

According to at least one embodiment of the disclosed invention, a protocol for separation is employed such that it runs at the low RPM kit (17) for two minutes (120 s) at 80 RPM. Said protocol is specifically employed for hair follicles.

According to at least one embodiment of the disclosed invention, a protocol for separation is employed such that it runs at the high RPM kit (18) for twelve minutes (720 s) at 100 RPM. Said protocol is specifically employed for fat tissue.

According to at least one embodiment of the disclosed invention, a protocol for separation is employed such that it runs at the low RPM kit (17) or the high RPM kit (18) for three minutes (180 s) at 120 RPM. Said protocol is specifically employed for cartilage tissue.

According to at least one embodiment of the disclosed invention, a protocol for homogenization is employed such that it runs for thirty seconds (30 s) at 2000 RPM. Said embodiment is configured to homogenize a mixture of hair follicle origin.

According to at least one embodiment of the disclosed invention, a protocol for homogenization is employed such that it runs for thirty seconds (30 s) at 2000 RPM. Said embodiment is configured to homogenize a mixture of cartilage origin.

According to at least one embodiment of the disclosed invention, a protocol for joint homogenization-photoactivation is employed such that it runs for a period between 15 and 20 minutes at 50 RPM. Said embodiment is configured for mixture(s) of hair follicle, fatty tissue and cartilage origin.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof"

or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A device for disaggregation and homogenization on histoid and cellular levels comprising:
at least one high revolution-per-minute (RPM) motor for homogenization and a low RPM motor for disaggregation;
a photoactivation light source situated adjacent a low RPM kit coupled with the low RPM motor, and a high RPM kit coupled with the high RPM motor, the low RPM kit and the high RPM kit being fully or at least partially translucent, or semi-transparent, and the photoactivation light source configured to emit light towards said low RPM kit and said high RPM kit in a lighting configuration for photoactivation configured to radiate in a range from 600 nm to 1 mm; and
an electronic control unit configured to execute protocols containing predefined sets of actions such that a mixture situated inside the low RPM kit or the high RPM kit is subjected to red light, near-infrared (IR) light, or IR light from the photoactivation light source while being homogenized.

2. The device for disaggregation and homogenization on histoid and cellular levels as set forth in claim 1, further comprising a casing, with air ducts to facilitate cooling.

3. The device for disaggregation and homogenization on histoid and cellular levels as set forth in claim 2, wherein the casing is made of aluminium.

4. The device for disaggregation and homogenization on histoid and cellular levels as set forth in claim 1, wherein the predefined sets of actions comprises controlling at least one of duration and revolution per minute of at least one of the low RPM motor, the high RPM motor, or a combination thereof.

5. The device for disaggregation and homogenization on histoid and cellular levels as set forth in claim 1, wherein the photoactivation light source is situated horizontally beneath the low RPM kit coupled with the low RPM motor, and the high RPM kit coupled with the high RPM motor.

6. The device for disaggregation and homogenization on histoid and cellular levels as set forth in claim 5, wherein the photoactivation light source is configured to emit light vertically towards said low RPM kit and said high RPM kit in a bottom-up lighting configuration.

7. The device for disaggregation and homogenization on histoid and cellular levels as set forth in claim 1, wherein the low RPM kit or the high RPM kit is simultaneously subjected to red light, near-infrared (IR) light, or IR light from the photoactivation light source while being homogenized.

8. A method for processing samples and mixtures into serums comprising:
preparing a plurality of mixtures; where the mixtures are produced using a plurality of samples of different histoid and cellular character(s),
kit preparation by inserting a respective produced mixture into a low revolution-per-minute (RPM) kit or a high RPM kit to render the respective produced mixture process-compatible,
performing a protocol for a homogenization and photoactivation processcomprising: subjecting a mixture situated inside one of the low RPM kit or the high RPM kit to red light, near-infrared (IR) light or IR light while being homogenized; controlling a duration of revolution of the low RPM kit or the high RPM kit to prevent rehomogenization; and controlling a rate of revolution of the low RPM kit or the high RPM kit to prevent kit deformation.

9. The method for processing samples and mixtures into serums as set forth in claim 8, wherein the mixture obtained after said homogenization and photoactivation process comprises photoactivated stem cells.

* * * * *